Sept. 20, 1932.　　　　S. N. SENNA　　　　1,878,446
TESTING APPARATUS
Filed April 6, 1929
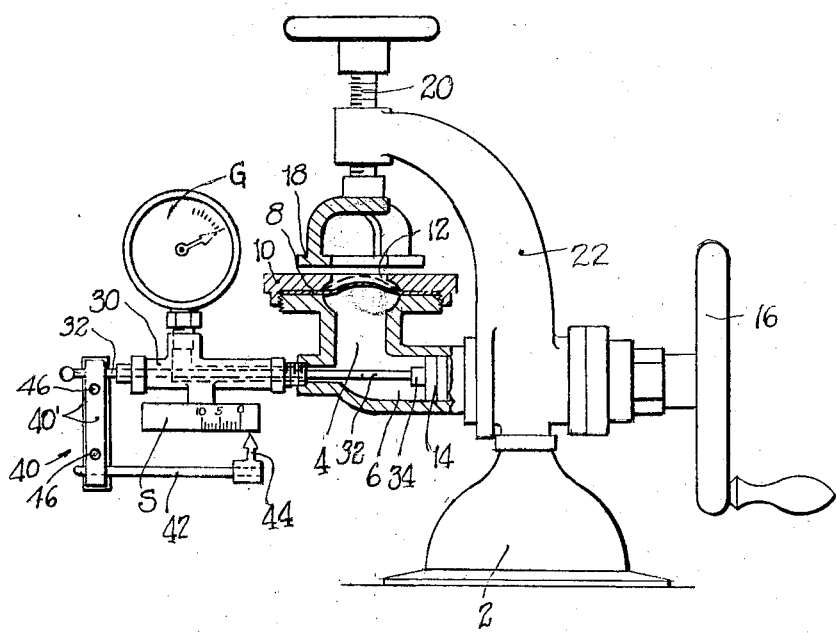
INVENTOR.
Samuel N. Senna
BY Walter C. Ross
ATTORNEY.

Patented Sept. 20, 1932

1,878,446

UNITED STATES PATENT OFFICE

SAMUEL N. SENNA, OF CHICOPEE, MASSACHUSETTS, ASSIGNOR TO B. F. PERKINS & SON, INC., OF HOLYOKE, MASSACHUSETTS, A CORPORATION OF MASSACHUSETTS

TESTING APPARATUS

Application filed April 6, 1929. Serial No. 353,170.

This invention relates to improvements in testing machines and is directed particularly to improvements in apparatus for rupturing specimens of paper, fabric and the like by elongating the same.

The invention is particularly adapted for use in connection with the testing apparatus shown and described in United States Letters Patent No. 924,625 issued June 8, 1909, and in order to facilitate a clear understanding of the novel features of the invention the apparatus of the patent referred to will be briefly described.

In this apparatus a specimen of paper or fabric is clamped to a platform over a central aperture thereof by a ring-like clamp. A diaphragm of elastic material is distended through the aperture by fluid pressure that it engages and elongates the specimen to rupture it. The pressure of the fluid at the instant of rupture is indicated by a pressure gauge and this indication is taken as the strength of the specimen. The fluid for distending the diaphragm is conveniently contained in a chamber and displaced by a piston for the elongating and rupturing operation.

As stated the pressure attained and as read on the gauge is used to designate the strength of the paper so that different specimens or different grades which are ruptured at different pressures may be classified accordingly.

It will be readily apparent that different specimens which rupture at different pressures may also elongate or stretch more or less relative to one another. The ability to stretch or elongate is an important consideration and specifications often require that certain material like paper have the ability to elongate to a definite extent as well as to withstand certain rupturing pressures.

To that end the novel features of this invention are directed to means associated with apparatus of the class referred to which cooperates therewith to indicate the extent of elongation of the specimen as it is ruptured during the testing operation.

The novel features and advantages of the invention will be apparent from the following description of the preferred form of the invention which is illustrated in the accompanying drawing wherein:

The figure is a side elevational view partly in section showing a testing machine having the novel features of the invention associated therewith.

Referring to the drawing in detail the invention will now be described.

A base is shown at 2 which is provided with a communicating fluid chamber 4, a bore 6 while a diaphragm 8 is clamped to the upper side of the chamber by a platform 10, which is provided with a central aperture 12 therethrough.

A piston 14 is movable back and forth in the bore 6 by a hand wheel 16 which is arranged for rotation as in U. S. Patent 924,625 referred to so that a liquid such as glycerine or the like within the chamber may be displaced to distend the diaphragm upwardly through the aperture in the platform 10.

A clamp 18 at the end of a rod 20 in threaded engagement with an arm 22 fixed to the base is preferably in the form of a ring so that to have a central aperture to correspond with that of the platform. By clamping a specimen of paper or the like to the platform by means of the clamp the central portion thereof is ruptured by the diaphragm as the liquid is displaced or its pressure built up by a forward movement of the piston. The pressure attained at the instant of rupture may be indicated by a pressure gauge and the pressure reading taken as the designation of the strength of the paper. This is ordinary practice. In the drawing the piston 14 is shown in its rear retracted position.

As previously mentioned it is desirable for many reasons to determine the extent of elongation of the specimen up to the time of rupture. To that end the following is provided: A T member 30 is connected to the base and is hollowed out so that pressure within the chamber may be communicated to a gauge G at the upper side of the T. A rod 32 slidable in the member 30 is arranged so that its rear end 34 is engaged and driven forwardly in the forward liquid displacing stroke of the piston 14. Thus as the piston is moved forwardly the rod 32 may be moved forwardly thereby. When the piston is moved to the retracted position shown in the drawing the operator presses his hand against the outer end of the rod 32 to force it to the right so that its inner end bears against the piston.

A graduated scale S is carried by the T and a clamp 40 adjustable on the rod 32 receives a rod 42, which has a pointer 44 fixed thereon for registering with the graduations of the scale. The clamp 40 preferably consists of a pair of bars 40' which are secured together by screws 46 and clamp therebetween the rods 32 and 42.

With the piston 14 in its retracted position and the rod 32 in abutment therewith the clamp is moved along rod 32 and adjusted in such a position that the pointer registers with the 0 graduation on the scale.

In operation with a specimen clamped to the platform the piston 14 is actuated to displace the liquid and distend the diaphragm for rupturing the specimen. Simultaneously with the forward movement of the piston the rod 32 is carried forwardly so as to move the pointer along the scale. When the specimen is ruptured and the piston 14 and rod 32 arrested in their movement the pointer of course is in register with some graduation on the scale. The length of travel of the piston and rod depends on the amount of pressure required to rupture the specimen and this distance of travel in conjunction with the pointer and scale may be taken as the amount of elongation of the specimen.

The graduations may be arbitrarily selected and while the elongation may not be actually represented on the scale the graduations may be taken as a standard. That is, a certain reading on the pressure gauge may indicate a specimen of certain strength which must be capable of being elongated to a certain degree which may be represented on the scale. Certain pressures and certain scale readings may well be worked out as a standard so that specimens may be tested for strength and elongation.

Having described the invention what I now claim and desire to secure by Letters Patent of the United States is:

A testing machine comprising in combination, a base provided with a piston bore and a fluid chamber in communication therewith, a piston reciprocable in said bore, a T member extending from said base having a bore, a gauge in communication with said bore of said T, a scale on said T member, a rod slidable in said T member in the path of movement of said piston having a part outside said T member, and a pointer associated with said part of the rod for registering with the said scale.

In testimony whereof I affix my signature.

SAMUEL N. SENNA.